United States Patent [19]
Widhoff

[11] 3,778,105
[45] Dec. 11, 1973

[54] DEVICE FOR STABILIZING REAR-TIPPING VEHICLES

[75] Inventor: Andre Widhoff, Paris, France

[73] Assignee: Frangeco, a Societe Anonyme Francaise, Puteaux-Hauts de Seine, France

[22] Filed: Dec. 30, 1970

[21] Appl. No.: 102,679

[30] Foreign Application Priority Data
Jan. 6, 1970 France .............................. 7000238

[52] U.S. Cl. .............................................. 298/17 S
[51] Int. Cl. .............................................. B60p 1/04
[58] Field of Search .................................. 298/17 S

[56] References Cited
UNITED STATES PATENTS
2,997,342   8/1961   Talbert .............................. 298/17 S
1,915,134   6/1933   MacPherson ...................... 298/17 S Primary Examiner—Gerald M. Forlenza
Assistant Examiner—John Mannix
Attorney—Greene & Durr

[57] ABSTRACT

Means are provided on either side of the rear axle of a dumping vehicle to limit the distance that the sides of dumping body can move away from the axle on being dumped, so as to avoid any lateral shifting of the center of gravity of the load due to relaxation of one of the side springs, especially when the vehicle is parked for dumping on a laterally inclined surface.

1 Claim, 15 Drawing Figures

PATENTED DEC 11 1973 3,778,105
SHEET 1 OF 3
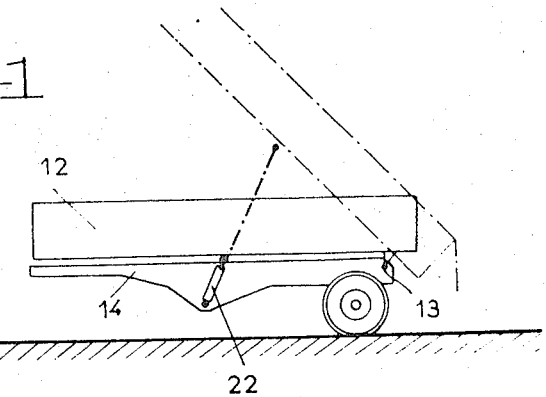
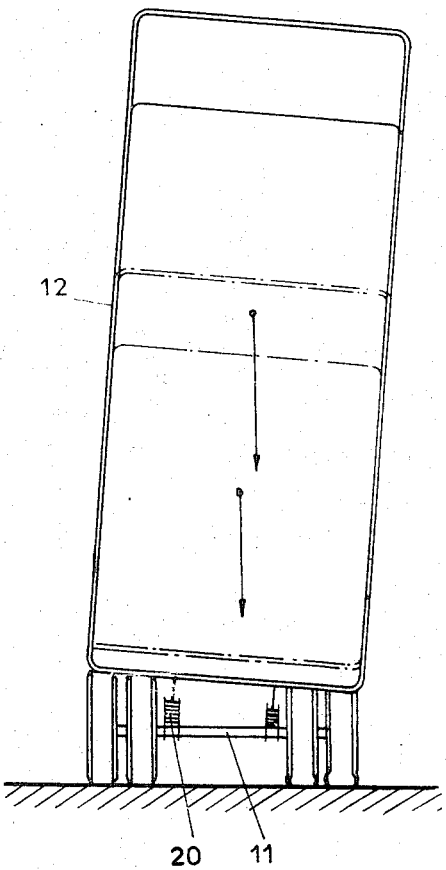
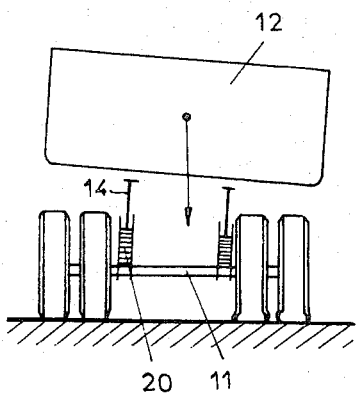
INVENTOR.
A. WIDHOFF
BY
Greene & Durr
ATTORNEY

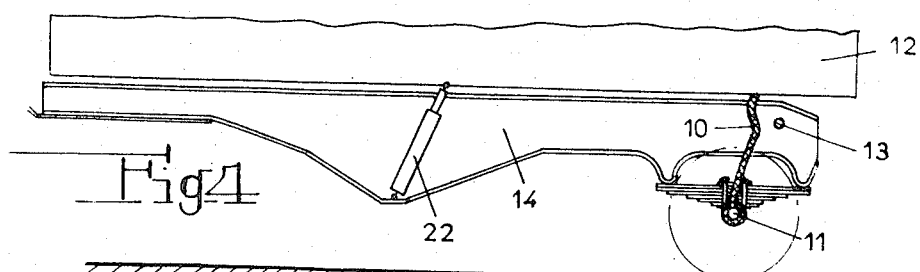
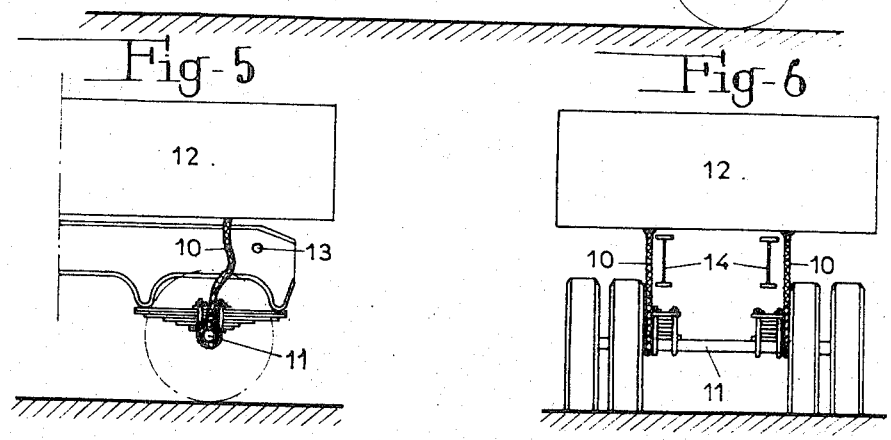
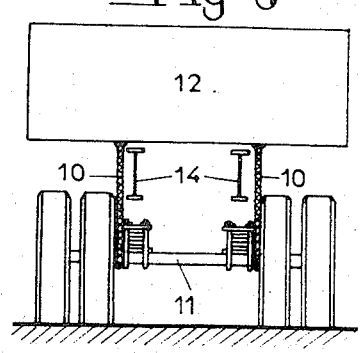
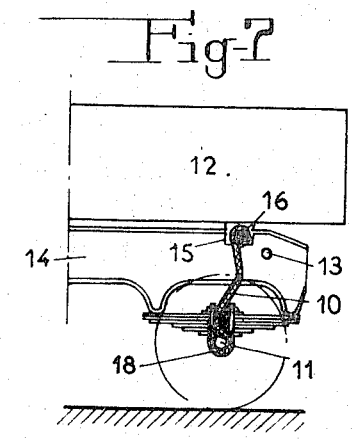
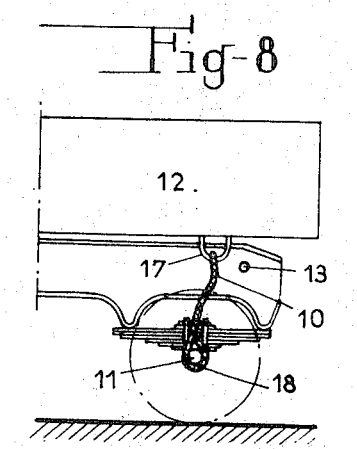
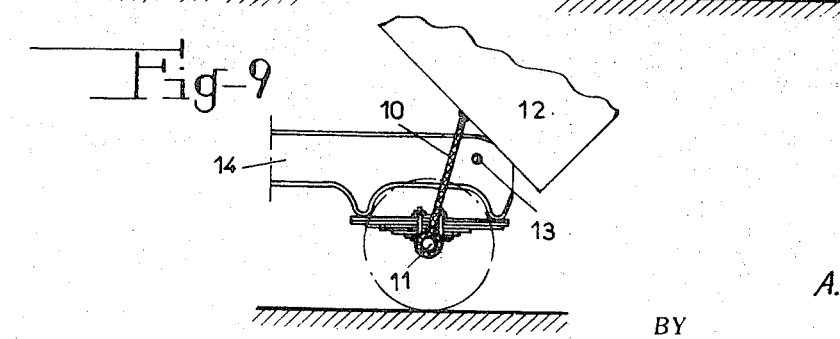
INVENTOR.
A. WIDHOFF
BY
ATTORNEY

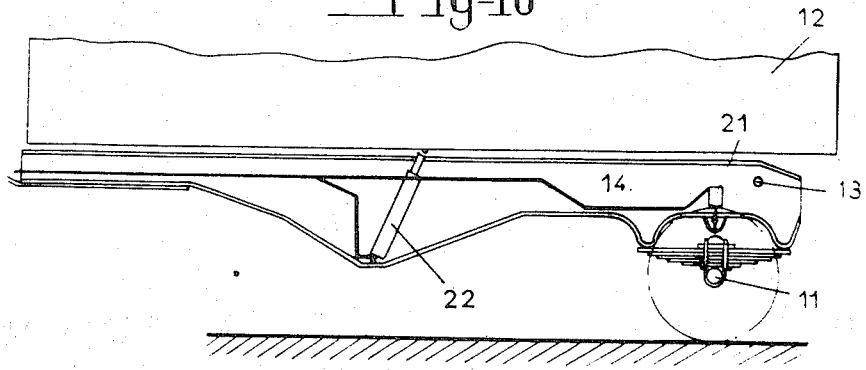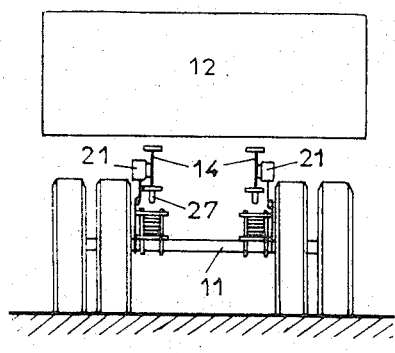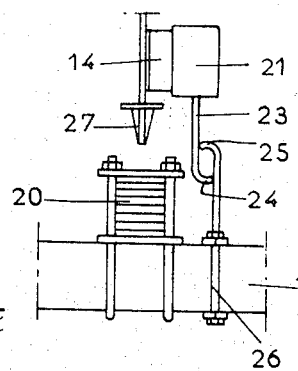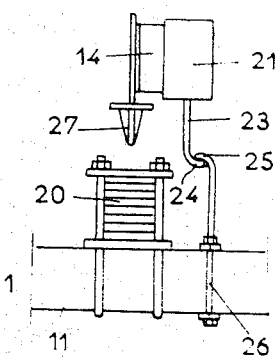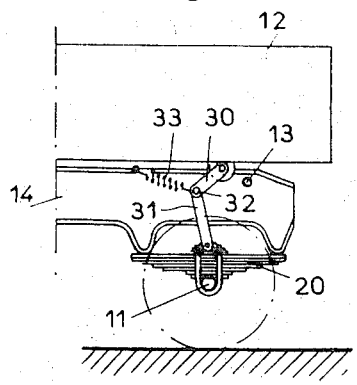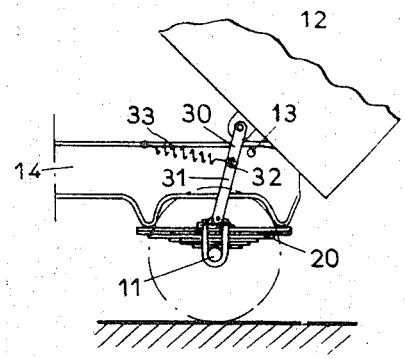

DEVICE FOR STABILIZING REAR-TIPPING VEHICLES

In the use of rear-tipping vehicles, particularly trailers and semi-trailers, it is not rare to see these vehicles overturn when dumping the load. This overturning may be due to a number of reasons which may combine with one another, particularly:

the action of the wind on the raised tipping body,
the looseness and inclination of the ground,
the transversal displacement of the center of gravity occurring during the raising of the body, and
badly distributed loading of the body.

Since the first two phenomena originate outside the vehicle, they are uncontrollable. On the other hand, it should be possible for the third to be mastered, and this is the essential object of the present invention.

In a vehicle with a rear-tipping dump body, the pivoting axis is practically always situated in a position which is slightly inclined in relation to the horizontal, because the ground is not flat or else because the center of of gravity is not prefectly in the axis of the body, so that one of the suspension springs of the chassis is more heavily loaded than the other. Under these conditions, the body turning about an oblique axis in the course of its rising, assumes an inclined position, which accentuates still further the lateral displacement of the center of gravity thereof, resulting in the further inclination of the body, as the load is further transferred to the spring which is already more heavily loaded. The more the body rises, the more this phenomenon is accentuated.

The application for patent already filed by the Applicants on the 25th of July 1968, under No. PV 160,582, already had the object of obviating this disadvantage by resisting the deflection of the more heavily loaded spring.

The present invention provides a second solution to the same problem, this time by resisting the relaxing of the less heavily loaded spring.

It is obvious that there is nothing to prevent the simultaneous adoption of these two means, and their combination will then provide maximum effect.

According to the invention, connecting means are provided between the body and the rear axle, on each side of the latter, these means permitting the free normal movement of the suspension when the vehicle is in the road position, that is to say with the body in normal, load carrying position. On the other hand, when dumping, after a certain rising movement of the body, said connecting means act on the less heavily loaded spring through the medium of the axle, so as to compress said spring; that is to say, in the direction corresponding to the lowering of the side of the chassis which is higher. The body is therefore unable to assume a dangerous inclination normally produced by the relaxing of the less heavily loaded spring.

In the drawings:

FIG. 1 is a side view of a conventional rear-tipping trailer, illustrating how the load is dumped.

FIG. 2 is an end view of a trailer as shown in FIG. 1, in the loading position, with a gravity vector from the center of gravity added to show what happens when the trailer is parked on an incline.

FIG. 3 is an end view similar to FIG. 2 but with the trailer in dumping positions.

FIG. 4 is a side view of an improved semi-trailer made according to the invention.

FIG. 5 is a detail view of the rear portion of FIG. 4.

FIG. 6 is a rear view of the trailer of FIG. 4.

FIGS. 7 and 8 are side views of somewhat modified forms of the device of FIGS. 4–6.

FIG. 9 is a side view of the semi-trailer of FIGS. 5 and 6, but with the body raised.

FIGS. 10 and 11 are views similar to FIGS. 4 and 6 of another modified form of the invention.

FIGS. 12 and 13 are detail views of the control means of FIGS. 10 and 11.

FIGS. 14 and 15 illustrate still another modified form of the invention.

FIGS. 1–3 illustrate how, as stated above, the center of gravity of a trailer on an incline becomes more off-center as the cart is pivoted to dump the contents.

Dumping vehicles, of the type described, are dumped by pivoting about an axis 13, which is parallel to and adjacent to the rear axle of the vehicle.

In the improved construction of FIGS. 4–9, the two cables 10, of identical length, connect the axle 11 to the body 12, the pivoting axis of which is situated at 13. These two cables are placed outside the chassis 14 in order to have maximum effectiveness. Each cable is fixed at one end to the body by a device which may be composed of a yoke 15 through which a pin 16 passes in cases where the cable is provided with an end thimble as illustrated in FIG. 7, or by being wound round a stirrup 17 welded on the botton of the body, as illustrated in FIG. 8, or by any other equivalent device.

At its other end, the cable 10 is fixed to the axle 11, for example, by a loop 18 surrounding said axle, or by any other equivalent device.

The length of the cable 10 is selected so that the normal deflection of the suspension is just permitted when the vehicle is in the running position, that is to say, with the body 12 in the lowered position (see FIGS. 4 to 8).

When the body starts to rise, the phenomen shown in FIGS. 1–3, which is to be counteracted, starts to occur in consequence of the slack allowed in the cable 10, but at the beginning this is not dangerous. Then, when the tipping angle of the body increases, the cables 10 tighten, starting with the cable which is situated on the side of the less loaded spring, namely the spring 20 in FIGS. 2 and 3, and this has the effect of recompressing said spring, which had been relaxed at the commencement of the rising of the body 12. When the body 12 continues to rise, the two cables 10 compress the springs by the same amount, since they are equal in length, and this has the effect of maintaining the pivotal axis 13 of the body 12 parallel to the axles, thus avoiding any worsening of the overturning phenomenon.

It is obvious that the length of the cables 10 and also the point at which they are fixed to the body, are selected so as to avoid abnormal compression of the springs.

In accordance with FIGS. 10–13, the device is composed essentially of two hydraulic jacks 21, which connect the axle 11 (or the axles), to the chassis 14 during the operation of tipping the body 12. These jacks are fed by the same circuit as the tipping jack 22, and at the same time as the latter. They are fixed ragidly to the chassis 14 in a position opposite the axle 11, on each side of the vehicle and at the end of their piston rod 23 are provided with a hook 24. Another symmetrical hook 25, fixed to the axle for example by means of clamp 26, is positioned to interconnect with said hook 23.

When the fluid operating the tipping jack 22 also acts on the jacks 21, it effects the displacement of the rods 23, the hooks 24 of which come into engagement with hooks 25 fixed on the axle 11 (FIG. 13).

The power of the jacks 21 is calculated so that they can compress the spring 20 until it bears against the corresponding stop 27 fixed on the chassis 14. The stroke of the jacks and the position of the stops are so constructed as to permit the normal deflection of the suspension and the compression of the springs within their normal flexibility.

In both cases a positive connection is made between the axle and the chassis from the commencement of the raising of the body, thus avoiding any relaxing of the less heavily loaded spring during the raising of the body. In the constructions shown in FIGS. 4–9, the connection between the axle and the chassis is indirect, i.e., through the body contacting the chassis, whereas in the construction shown in FIGS. 10–13 the axle is directly connectible to the chassis.

As compared to the cable device, the jack device provides the advantage of coming into action simultaneously with the application of pressure to the body raising jacks 22, which pressure is often maximum for very small tipping angles.

When the pressure is interrupted in the tipping jack, for the purpose of lowering the body, the pressure is simultaneously relaxed in the jacks 21, the rods 23 of which thus resume their original position because of the internal return springs (not shown), with which they are provided, thus freeing the suspension.

Finally, FIGS. 14 and 15 illustrate, another embodiment in which the connection means used are toggle joints, each of which has the two branches 30,31 pivotally linked together at 32 and are likewise connected to the body 13 on the one hand, and to the axle 11 on the other hand, in any suitable manner. A traction spring 33 connects the pivot 32 to a fixed point on the chassis in order to break the joint and thus prevent it from remaining in its dead centre position as indicated in FIG. 15, in which position it provides a positive connection between the body 12 and the axle 11. Said toggle levers compress the less heavily loaded spring 20, when the position shown in FIG. 15 is reached, under the conditions described above. When the body is in its lower position, the two toggle levers occupy the positions shown in FIG. 14, and they automatically resume this road position under the action of the spring 33 when the body is lowered, after dumping.

The examples of embodiment described and illustrated are naturally somewhat schematic and numerous constructional modifications can be made thereto without departing from the scope of the invention.

It may be added that the invention is equally applicable to tipping vehicles having lateral tipping jacks and to those utilizing one or two front jacks and even to those equipped with twin axles.

I claim:

1. In a rear-tipping type of dumping vehicle which has a rear axle connected to a chassis through a pair of springs at each side of the chassis and a body pivotally mounted on the chassis about an axis parallel to and adjacent said rear axle, the improvement comprising a pair of means, one at each side of said rear axle, each of said pair of means comprising a toggle joint, each having its ends linked to the axle and to the corresponding side of the body, respectively, the length of the joint when straightened being such as to limit the movement of the side of the body away from the axle when one of said springs is relaxed by a shifting of the center of gravity of the load while dumping and spring means adapted to break the toggle joint from its straightened position, when the body is lowered.

* * * * *